US012352319B2

United States Patent
Singh et al.

(10) Patent No.: US 12,352,319 B2
(45) Date of Patent: Jul. 8, 2025

(54) ANTI-ROTATE PISTON FOR VEHICLE TRANSMISSION

(71) Applicant: FCA US LLC, Auburn Hills, MI (US)

(72) Inventors: Tejinder Singh, West Bloomfield, MI (US); Richard J Scorzelli, Fowlerville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/499,709

(22) Filed: Nov. 1, 2023

(65) Prior Publication Data

US 2025/0137497 A1    May 1, 2025

(51) Int. Cl.
  *F16D 25/0638*  (2006.01)
  *F16H 63/30*   (2006.01)

(52) U.S. Cl.
  CPC ..... *F16D 25/0638* (2013.01); *F16H 63/3026* (2013.01)

(58) Field of Classification Search
  CPC ......... F16D 25/0638; F16D 2021/0661; F16D 25/085; F16D 2048/0212; F16D 2048/0293; F16D 25/082; F16D 25/10; F16H 63/3026; F16H 2025/081
  See application file for complete search history.

(56) References Cited

U.S. PATENT DOCUMENTS

| 10,072,683 | B1* | 9/2018 | Nader ................ F16H 61/0265 |
| 2007/0181396 | A1* | 8/2007 | Maienschein ........... F16H 45/02 |
| | | | 192/3.29 |
| 2020/0164733 | A1* | 5/2020 | Hauck .................... F16D 25/082 |
| 2020/0362924 | A1* | 11/2020 | Desing ................. F16H 57/045 |
| 2022/0118847 | A1* | 4/2022 | Ekonen .............. B60K 17/3467 |
| 2023/0193963 | A1* | 6/2023 | Weis ....................... B60K 6/387 |
| | | | 192/48.609 |
| 2023/0265911 | A1* | 8/2023 | Bastiaansen ........ F16H 57/0426 |
| | | | 192/48.1 |

FOREIGN PATENT DOCUMENTS

| CN | 110118254 A | * | 8/2019 | ............ F16D 25/12 |
| WO | WO-2019166511 A1 | * | 9/2019 | ............ F16D 21/06 |

* cited by examiner

*Primary Examiner* — Farhana Pervin
(74) *Attorney, Agent, or Firm* — Jeremy J. Klobucar

(57) ABSTRACT

A transmission includes a housing defining an actuator cavity, a plurality of clutches disposed within the housing and configured to be engaged in various combinations to generate gear ratios corresponding to forward speeds of the transmission, and an actuator assembly configured to selectively engage one clutch of the plurality of clutches, the actuator assembly including a piston slidingly disposed within the actuator cavity. An anti-rotation assembly is configured to prevent rotation of the piston within the actuator cavity, the anti-rotation assembly including a stop and a projection. The projection is coupled to and extends outwardly from an interior surface of the piston, and the stop is grounded to the housing and includes a bore configured to receive a distal end of the projection to thereby prevent rotation of the projection and piston.

17 Claims, 1 Drawing Sheet

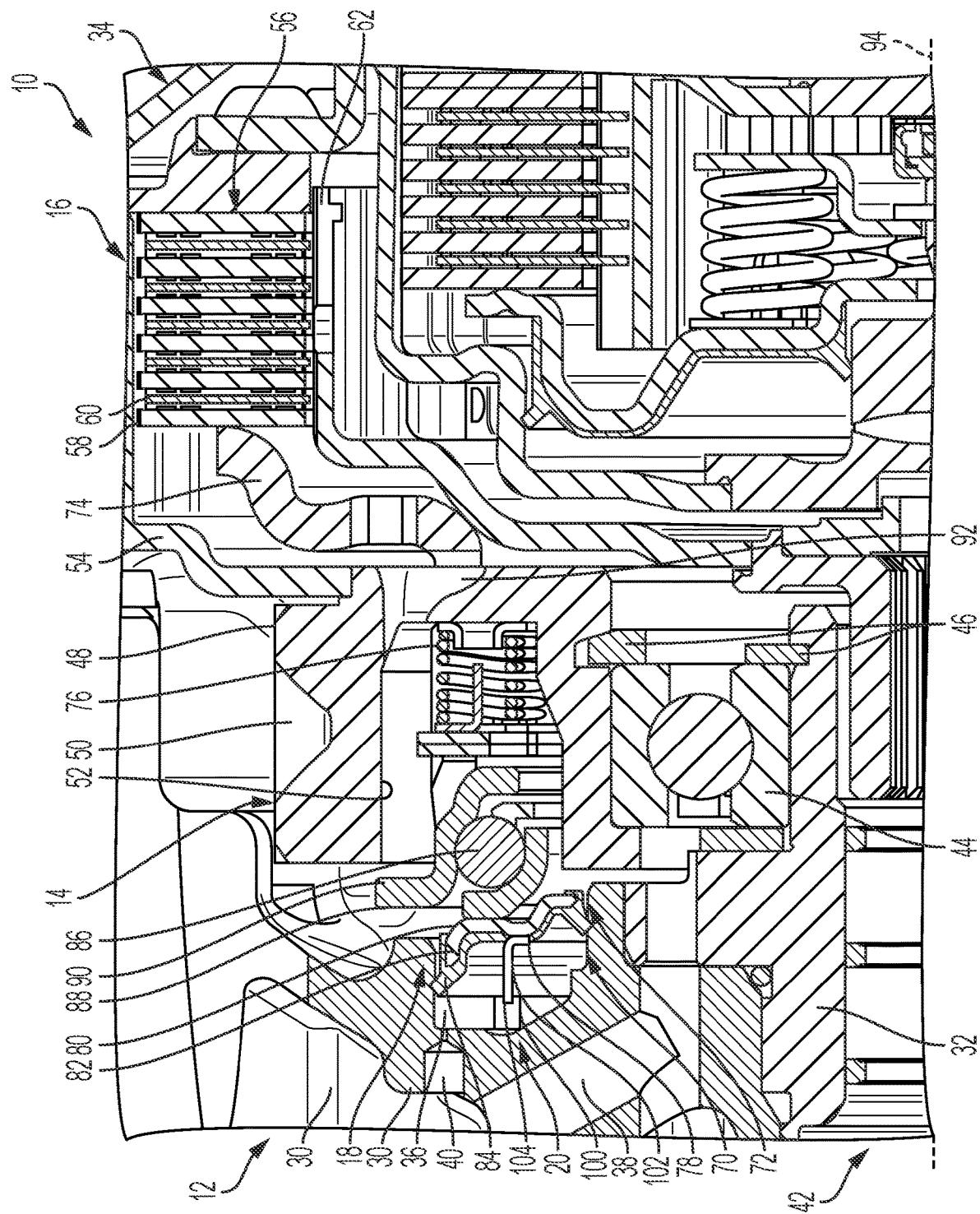

ANTI-ROTATE PISTON FOR VEHICLE TRANSMISSION

FIELD

The present application relates generally to an automatic transmission for a vehicle and, more particularly, to an automatic transmission with an anti-rotation clutch piston.

BACKGROUND

Automatic transmissions are complex machines that often include a multitude of moving parts such as planetary gear sets, clutches, and brakes to selectively shift the transmission between a plurality of drive gears. Such shifts may be accomplished through selective actuation of one or more pistons. However, over time, rotational forces within the transmission may cause unwanted rotation of the piston, which can potentially cause drag and result in undesirable wear on the pistons or surrounding components. Accordingly, while such conventional systems work well for their intended purpose, there is a desire for improvement in the relevant art.

SUMMARY

In accordance with one example aspect of the invention, a transmission is provided. In one example implementation, the transmission includes a housing defining an actuator cavity, a plurality of clutches disposed within the housing and configured to be engaged in various combinations to generate gear ratios corresponding to forward speeds of the transmission, and an actuator assembly configured to selectively engage one clutch of the plurality of clutches, the actuator assembly including a piston slidingly disposed within the actuator cavity. An anti-rotation assembly is configured to prevent rotation of the piston within the actuator cavity, the anti-rotation assembly including a stop and a projection. The projection is coupled to and extends outwardly from an interior surface of the piston, and the stop is grounded to the housing and includes a bore configured to receive a distal end of the projection to thereby prevent rotation of the projection and piston.

In addition to the foregoing, the described transmission may include one or more of the following features: wherein the stop is integrally cast with the housing and the bore is machined therein; wherein the piston is generally concave and the inner surface defines a concave surface of the piston; wherein the actuator cavity is a hydraulic cavity configured to selectively receive a supply of hydraulic fluid to actuate the actuator assembly to engage the one clutch; wherein the piston is a hydraulic piston having a body with a seal configured to seal against an inner wall of the housing that defines the hydraulic cavity; and wherein the actuator assembly further comprises a clutch-apply member configured to be engaged by the piston to thereby engage the one clutch.

In addition to the foregoing, the described transmission may include one or more of the following features: wherein the actuator assembly further comprises a return spring configured to move the clutch-apply member out of engagement with the one clutch; wherein the one clutch is a friction clutch having a clutch housing and a clutch pack; wherein the clutch pack includes alternating sets of first and second friction plates; wherein the first friction plates are coupled to the clutch housing and the second friction plates are coupled to a hub; an input gear rotatably supported within the housing, the input gear including a plurality of gear teeth configured to mesh with an output of a propulsion device; wherein the clutch housing is coupled to the input gear for rotation therewith; and wherein the clutch-apply member extends through a slot formed in the input gear.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWING

FIG. 1 is a cross-sectional view of an example automatic transmission with a piston anti-rotation feature in accordance with the principles of the present application.

DETAILED DESCRIPTION

As discussed above, a vehicle transmission may produce rotational forces that cause a component, such as a piston, to undesirably rotate and result in unwanted wear. Accordingly, described herein is an anti-rotation feature configured to prevent rotation of a transmission component such as a clutch piston. Although described in relation to the clutch piston, it will be appreciated that the described anti-rotation feature may be utilized with any desired component of a vehicle transmission.

With initial reference to FIG. 1, an example automatic transmission for use in a motor vehicle is illustrated and generally identified at reference numeral 10. It will be appreciated that the systems and methods described herein are not limited to automatic transmissions or motor vehicles and may be utilized in other transmissions or systems. In the example embodiment, the transmission 10 generally includes a housing 12, an input gear 14, a friction clutch assembly 16, an actuator assembly 18, and an anti-rotation assembly 20.

In the illustrated implementation, the housing 12 includes a cast and machined outer housing 30 and inner housing 32, which are grounded. The outer housing 30 defines an inner cavity 34 configured to receive various components of the transmission 10, such as planetary gear sets, clutches, and brakes. Additionally, the outer housing 30 defines an actuator cavity 36 to house a portion of the actuator assembly 18.

In the example embodiment, the actuator cavity is a hydraulic cavity 36 configured to receive a flow of pressurized hydraulic fluid through a hydraulic passage 38 for selective actuation of the actuator assembly 18, as described herein in more detail. A bleed passage 40 is formed in the outer housing 30 and configured to vent air from the hydraulic cavity 36. The inner housing 32 is at least partially disposed within the outer housing 30 and defines a bore 42 configured to receive a shaft (not shown).

In the example embodiment, the input gear 14 is disposed within the housing 30 and is rotatably supported on the inner housing 32 by a bearing 44, which is at least partially held in place by snap rings 46. An outer diameter or surface 48 of the input gear 14 includes a plurality of gear teeth 50 configured to mesh with an output gear of a propulsion device, such as an electric traction motor or an internal combustion engine (not shown). The input gear 14 defines an internal cavity 52 configured to receive at least a portion of the actuator assembly 18.

In the illustrated example, the friction clutch assembly 16 is a multi-plate clutch having a clutch housing 54 and a clutch pack 56. The clutch housing 54 is coupled for rotation with the input gear 14, and the clutch pack 56 includes alternating sets of first and second friction plates 58, 60. The first friction plates 58 are coupled to the clutch housing 54, and the second friction plates 60 are coupled to a hub 62 configured to spline to the shaft received through shaft bore 42. When actuator assembly 18 is disengaged, the first friction plates 58 rotate freely with input gear 14. When actuator assembly 18 is engaged, for example through hydraulic pressure, the first friction plates 58 engage the second friction plates 60 to thereby rotate hub 62.

In the example embodiment, the actuator assembly 18 generally includes a hydraulic piston 70, a bearing 72, a clutch-apply plate or member 74, and a return spring 76. The hydraulic piston 70 is disposed within the hydraulic cavity 36 and is generally concave or bowl-shaped to define an inner surface 78 and an opposite outer surface 80. In the illustrated example, the hydraulic piston 70 is generally annular and includes a body 82 encased in or coupled to a seal 84, which seals against upper and lower interior surfaces (as shown in FIG. 1) of the hydraulic cavity 36. The hydraulic piston 70 is configured to translate left and right (as shown in FIG. 1) based on a supply of hydraulic fluid to the hydraulic cavity 36 that is controlled by a controller (not shown). Although described as hydraulically actuated, it will be appreciated that piston 70 may be actuated in any suitable manner such as, for example, pneumatically, magnetically, electro-mechanically, etc.

In the example embodiment, the bearing 72 is a throw-out bearing and includes a plurality of ball bearings 86 seated between an outer race 88 and an inner race 90. The outer race 88 is configured to be stationary and the inner race 90 is coupled to the input gear 14 for rotation therewith. The clutch-apply member 74 extends through a slot 92 formed through input gear 14. One end of the clutch-apply member 74 is coupled to or interfaces with bearing 72, and the opposite end of the clutch-apply member 74 is configured to selectively engage the clutch pack 56. The return spring 76 is configured to bias the clutch-apply member 74 leftward (as shown in FIG. 1) to disengage the clutch pack 56.

With continued reference to FIG. 1, the anti-rotation assembly 20 will be described in more detail. During operation, unintended drag may potentially cause the bearing outer race 88 to rotate. Friction between the outer race 88 and the piston 70 may subsequently cause the piston 70 to rotate about an axis 94 within the hydraulic cavity 36, thereby causing undesirable wear to the piston 70 or housing 12. Accordingly, the anti-rotation assembly 20 is configured to prevent rotation of the piston 70 within the hydraulic cavity 36.

In the example embodiment, the anti-rotation assembly 20 generally includes a stop 100 and a projection 102. In one example the stop 100 is a nub, projection, or the like extending outwardly from the transmission housing 12 into the hydraulic cavity 36. The stop 100 may be integrally formed or cast with the housing 12 or subsequently attached thereto, for example, via welding. The stop 100 includes a slot or bore 104 formed (e.g., machined) therein and configured to receive the distal end of the projection 102. In the example embodiment, the projection 102 is a pin, blade, plate or the like configured to be coupled (e.g., welded) to the inner surface 78 of the piston 70. The projection 102 extends outwardly from the piston inner surface 78 into the hydraulic cavity 36 and into the bore 104 formed in stop 100. In this way, the stop 100, which is grounded to housing 12 and does not rotate, receives the projection 102 within the bore 104. Accordingly, the piston 70 has an internal anti-rotation feature that prevents rotation of piston 70 by the engagement of projection 102 and stop 100.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A transmission comprising:
a housing defining an actuator cavity;
a plurality of clutches disposed within the housing and configured to be engaged in various combinations to generate gear ratios corresponding to forward speeds of the transmission;
an actuator assembly configured to selectively engage one clutch of the plurality of clutches, the actuator assembly including a piston slidingly disposed within the actuator cavity; and
an anti-rotation assembly configured to prevent rotation of the piston within the actuator cavity, the anti-rotation assembly including a stop and a projection,
wherein the piston is generally concave and includes a concave inner surface,
wherein the projection is coupled to and extends outwardly from the concave inner surface of the piston,
wherein the stop is grounded to the housing and is fixed from rotation, and includes a bore configured to receive a distal end of the projection to thereby prevent rotation of the projection and piston, and
wherein the stop is a protrusion extending outwardly from the housing into the actuator cavity.

2. The transmission of claim 1, wherein the stop is integrally cast with the housing and the bore is machined therein.

3. The transmission of claim 1, wherein the housing is grounded such that the stop is fixed from rotation.

4. The transmission of claim 1, wherein the actuator cavity is a hydraulic cavity configured to selectively receive a supply of hydraulic fluid to actuate the actuator assembly to engage the one clutch.

5. The transmission of claim 4, wherein the piston is a hydraulic piston having a body with a seal configured to seal against an inner wall of the housing that defines the hydraulic cavity, and
wherein the supply of hydraulic fluid acts against the concave inner surface of the piston.

6. The transmission of claim 1, wherein the actuator assembly further comprises a clutch-apply member configured to be engaged by the piston to thereby engage the one clutch.

7. The transmission of claim 6, wherein the actuator assembly further comprises a return spring configured to move the clutch-apply member out of engagement with the one clutch.

8. The transmission of claim 6, wherein the one clutch is a friction clutch having a clutch housing and a clutch pack.

9. The transmission of claim 8, wherein the clutch pack includes alternating sets of first and second friction plates.

10. The transmission of claim 9, wherein the first friction plates are coupled to the clutch housing and the second friction plates are coupled to a hub.

11. The transmission of claim 8, further comprising an input gear rotatably supported within the housing, the input gear including a plurality of gear teeth configured to mesh with an output of a propulsion device.

12. The transmission of claim 11, wherein the clutch housing is coupled to the input gear for rotation therewith.

13. The transmission of claim 11, wherein the clutch-apply member extends through a slot formed in the input gear.

14. The transmission of claim 1, wherein the stop is disposed across the actuator cavity from and faces toward the concave inner surface of the piston.

15. A transmission comprising:
a grounded housing fixed from rotation and defining a hydraulic actuator cavity;
a plurality of clutches disposed within the housing and configured to be engaged in various combinations to generate gear ratios corresponding to forward speeds of the transmission;
an actuator assembly configured to selectively engage one clutch of the plurality of clutches, the actuator assembly including a piston slidingly disposed within the actuator cavity, wherein the piston is generally concave and includes a concave inner surface; and
an anti-rotation assembly configured to prevent rotation of the piston within the actuator cavity, the anti-rotation assembly including a stop and a projection,
wherein the hydraulic actuator cavity is configured to selectively receive a supply of hydraulic fluid to act against the concave inner surface of the piston to actuate the actuator assembly to engage the one clutch,
wherein the projection is coupled to and extends outwardly from the concave inner surface of the piston,
wherein the stop is integrally cast with and grounded to the housing to be fixed from rotation, and wherein the stop is a protrusion extending outwardly from the housing into the hydraulic actuator cavity and includes a bore configured to receive a distal end of the projection to thereby prevent rotation of the projection and piston.

16. The transmission of claim 15, wherein the actuator assembly further comprises:
a clutch-apply member configured to be engaged by the piston to thereby engage the one clutch; and
a return spring configured to move the clutch-apply member out of engagement with the one clutch,
wherein the one clutch is a friction clutch having a clutch housing and a clutch pack that includes alternating sets of first and second friction plates respectively coupled to the clutch housing and a hub.

17. The transmission of claim 16, further comprising an input gear rotatably supported within the housing, the input gear including a plurality of gear teeth configured to mesh with an output of a propulsion device,
wherein the clutch housing is coupled to the input gear for rotation therewith, and
wherein the clutch-apply member extends through a slot formed in the input gear.

\* \* \* \* \*